(12) United States Patent
Stephan

(10) Patent No.: US 9,206,805 B2
(45) Date of Patent: Dec. 8, 2015

(54) AIR REGULATOR, IN PARTICULAR FOR SCREW COMPRESSORS

(75) Inventor: Enrico Stephan, München (DE)

(73) Assignee: Rotorcomp Verdichter GmbH, Germering (DE)

( * ) Notice: Subject to any disclaimer, the term of this patent is extended or adjusted under 35 U.S.C. 154(b) by 88 days.

(21) Appl. No.: 14/009,175

(22) PCT Filed: Mar. 30, 2012

(86) PCT No.: PCT/EP2012/001440
§ 371 (c)(1),
(2), (4) Date: Oct. 1, 2013

(87) PCT Pub. No.: WO2012/130473
PCT Pub. Date: Apr. 10, 2012

(65) Prior Publication Data
US 2014/0193284 A1    Jul. 10, 2014

(30) Foreign Application Priority Data

Apr. 1, 2011  (DE) .......................... 10 2011 015 805
Mar. 29, 2012  (DE) .......................... 10 2012 006 363

(51) Int. Cl.
| | |
|---|---|
| *F04C 29/12* | (2006.01) |
| *F04C 18/16* | (2006.01) |
| *F04C 28/06* | (2006.01) |
| *F04C 28/24* | (2006.01) |
| *F16K 31/122* | (2006.01) |

(52) U.S. Cl.
CPC ............... *F04C 29/124* (2013.01); *F04C 18/16* (2013.01); *F04C 28/06* (2013.01); *F04C 28/24* (2013.01); *F16K 31/1221* (2013.01); *F16K 31/1223* (2013.01)

(58) Field of Classification Search
CPC ........ F04C 18/16; F04C 28/06; F04C 29/124; F04C 28/24; F16K 31/123; F16K 31/1221
USPC .................. 137/565.01, 237, 238, 505.13
See application file for complete search history.

(56) References Cited

U.S. PATENT DOCUMENTS

| 3,873,239 | A | * | 3/1975 | Jamieson ..................... 417/281 |
| 4,076,461 | A | * | 2/1978 | Moody et al. ................ 417/310 |
| 4,412,788 | A | * | 11/1983 | Shaw et al. .................. 417/280 |

(Continued)

FOREIGN PATENT DOCUMENTS

| DE | 32 10 790 A1 | 10/1983 |
| WO | 2007/101901 A1 | 9/2007 |

*Primary Examiner* — Craig Schneider
*Assistant Examiner* — Kevin Barss
(74) *Attorney, Agent, or Firm* — Roberts Mlotkowski Safran & Cole, PC

(57) ABSTRACT

An air regulator for compressor, in particular for a screw compressor, of the type that has an oil separator device comprising a pre-separator, is provided in a regulator housing containing a valve element which is spring-loaded on one side and can be actuated by means of a piston arrangement. A control device is operatively connected to the air regulator and includes a control piston which, depending on the pre-separator pressure, actuates the valve element of the air regulator in co-operation with a pre-control device in such a way that the regulator immediately and forcibly assumes the closed position upon starting the compressor, while the regulator assumes the open position in an unloaded initial state.

10 Claims, 2 Drawing Sheets

(56) References Cited

U.S. PATENT DOCUMENTS

| | | | |
|---|---|---|---|
| 4,762,469 A * | 8/1988 | Tischer | 417/279 |
| 4,974,584 A * | 12/1990 | Goodnoe | 128/202.13 |
| 5,018,948 A * | 5/1991 | Sjte et al. | 417/302 |
| 5,268,036 A * | 12/1993 | Neubauer et al. | 134/2 |
| 5,509,273 A * | 4/1996 | Lakowske et al. | 62/228.5 |
| 5,979,168 A * | 11/1999 | Beekman | 62/228.5 |
| 6,257,837 B1 * | 7/2001 | Adams et al. | 417/228 |
| 6,675,592 B2 * | 1/2004 | Huang et al. | 62/176.6 |
| 7,287,398 B2 * | 10/2007 | Noda et al. | 62/434 |
| 7,316,546 B2 | 1/2008 | Daniëls et al. | |
| 7,531,018 B2 * | 5/2009 | Becker et al. | 55/423 |
| 2003/0002992 A1 * | 1/2003 | Hugenroth | 417/228 |
| 2004/0151602 A1 | 8/2004 | Daniels et al. | |

* cited by examiner

AIR REGULATOR, IN PARTICULAR FOR SCREW COMPRESSORS

BACKGROUND OF THE INVENTION

1. Field of the Invention

The invention relates to an air regulator for compressors, especially screw compressors, which have an oil separator apparatus with a pre-separator, and a regulator housing with a spring-loaded valve element which can be actuated by means of a piston arrangement.

2. Description of Related Art

It is generally known that regulators can either be designed such that they are open in the base state or are closed in the base state. Regulators which are closed in the base state are used especially in screw compressors in order to avoid high-inertia starting, mainly when cold. Generally, the starting of such a screw compressor is at first also enabled using the regulator which is closed in the base state. Such a regulator which is closed in the base state has a strong pretensioning spring which keeps the regulator in its closed position during starting or relief. As a result of the high spring forces in this regulator, unfavorable behavior results with respect to the control quality and control rate.

SUMMARY OF THE INVENTION

The invention is directed, while overcoming the above described difficulties, at making available an air regulator for compressors, in particular screw compressors, which effectively prevents high-inertia starting in the screw compressor, makes available precision regulator behavior in compressor operation and still has a space-saving structure which is mechanically as simple as possible.

In accordance with the invention, for this purpose, an air regulator for compressors, especially screw compressors, is provided which have an oil separator apparatus with a pre-separator, and a regulator housing with a valve element which is spring-loaded on one side and which can be actuated by means of a piston arrangement, a control apparatus being dynamically connected to the air regulator and containing a control piston, the air regulator being characterized in that the control piston, depending on the pre-separator pressure in interaction with a pilot control apparatus, actuates the valve element of the air regulator such that the regulator is immediately forced to assume its closed position when the compressor is started, and in the base state, it is in an open position.

In the design in accordance with the invention, the air regulator has a basic behavior which is open in the base state so that large spring forces are not required to keep the air regulator in its closed position during starting. However, due to the control apparatus which is provided in accordance with the invention, the air regulator and its valve element are actuated such that the air regulator is immediately forced to assume its closed position when the compressor is started so that high-inertia starting can be effectively avoided.

The system pressure is reached immediately after starting of the compressor via a preferably provided diversion apparatus which is integrated into the air regulator. Using the pilot control apparatus of the control apparatus, the pre-separator pressure which has been produced by the compressor directly after starting of the compressor or the direct outlet pressure of the compressor is effectively used to move the air regulator immediately into the closed position. Since the invention effectively avoids strong spring forces, precision control behavior with improved control quality and rate is obtained during compressor operation. Since the regulator is open in the base position, but with the control apparatus immediately triggering closing of the regulator, the regulator in accordance with the invention combines both the property of a regulator which is open in the base state and also those properties of a regulator which is closed in the base state. Pressure piling in the transition into the idling state of a compressor can also be effectively suppressed. In the closed position of the regulator, there is a relatively low closing pressure starting at 0.5 bar to roughly 2.5 bar, as a result of which the overall structure in accordance with the invention is further simplified in addition.

Preferably, the air regulator in accordance with the invention is pneumatically or electrically triggered, and of course, optionally, also a hydraulic or a combination of several methods of triggering can be implemented. The air regulator in accordance with the invention can be operated under the most varied conditions of use by this versatile triggering capacity of the air regulator and of the control apparatus.

Preferably, the control apparatus contains a check valve in the line path between the control medium and the pre-separator medium. Relief of the pressure space can be effectively implemented by this check valve when the compressor is being loaded.

Preferably, the pilot control apparatus has a valve magnet. When the valve magnet has a relatively large cross section, separation of the control line and the piston arrangement for closing of the valve element and an optionally provided relief line can be omitted. In this way, the construction of such an air regulator is simplified.

Preferably, the control apparatus is attached directly to the regulator housing so that no additional connecting lines need be installed which can lead to leaks and the like, but the control apparatus directly triggers the corresponding switching motion of the air regulator.

Preferably, the apparatus is laid out such that the control apparatus is in communication with the regulator-positioning piston loading arrangement and a relief apparatus. Thus, in the design of the air regulator in accordance with the invention, all operationally important components are integrated in the regulator housing or in the control apparatus which is attached to the regulator housing.

Preferably, the air regulator comprises a diversion apparatus which is integrated into the regulator itself. This diversion apparatus yields continuous cleaning and lubrication of the compressor. Continuous circulation of the medium arises and no dead areas form by way of a preferably provided diversion nozzle of the diversion apparatus which discharges directly via a bore into the intake space of the compressor. The cross section of the diversion nozzle is designed and made so that the loading pressure to close the regulator by the piston and the diversion always takes place linearly.

Frothing and flooding of the intake region are prevented by the differential pressure from the pre-separator always being greater than that of the control medium and the relief in the air regulator being separated from the control apparatus by a check valve.

In summary, in the air regulator for compressors, especially screw compressors, it is important in accordance with the invention that the air regulator is dynamically connected to a control apparatus such that a control piston which is preferably designed as a differential pressure piston, depending on a pre-separation pressure and interacting with a pilot control apparatus, immediately forces the valve element of the air regulator into its closed position when the compressor is started. In the base state the air regulator is designed such that in this base state it assumes its open position.

The invention is characterized in particular by an air regulator configuration which is integrated into the compressor housing.

The invention is explained in detail below using one preferred non-limiting embodiment with reference to the accompanying drawings.

DETAILED DESCRIPTION OF THE INVENTION

The same or similar parts are labeled with the same reference numbers in the figures.

Figure 1:
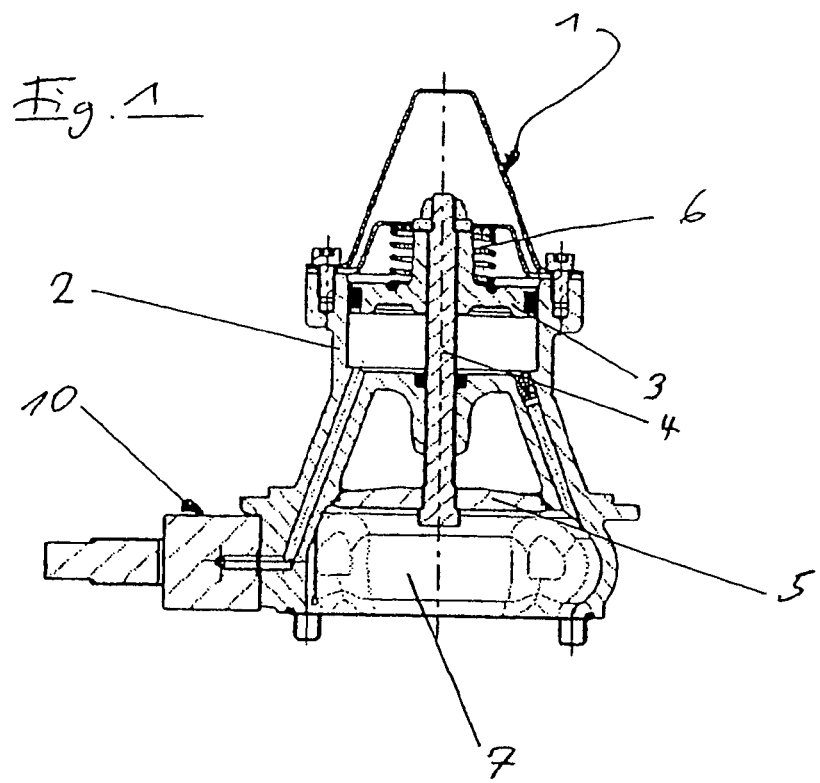
FIG. 1 is a sectional view an air regulator in accordance with the invention as an overall view.

With reference to FIG. 1, there an air regulator is labeled overall with reference number 1. The air regulator 1 is designed for a compressor which is not shown, in particular a screw compressor. The air regulator 1 has a regulator housing 2 in which there is a spring-loaded valve element 4 which can be actuated by means of a piston arrangement 3. The valve element 4 on one end bears a valve disk 5 which in the closed position comes into corresponding seating contact with the regulator housing 2. Using the piston arrangement 3, then the valve element 4 is moved against the preloading force of a pretensioning spring 6 such that the valve disk 5 is raised out of the seating contact shown in FIG. 1 out of the closed position. A control apparatus 10 is attached securely to the regulator housing 2. The intake space 7 of the compressor which is shown in detail, such as a screw compressor in FIG. 1.

Figure 2:
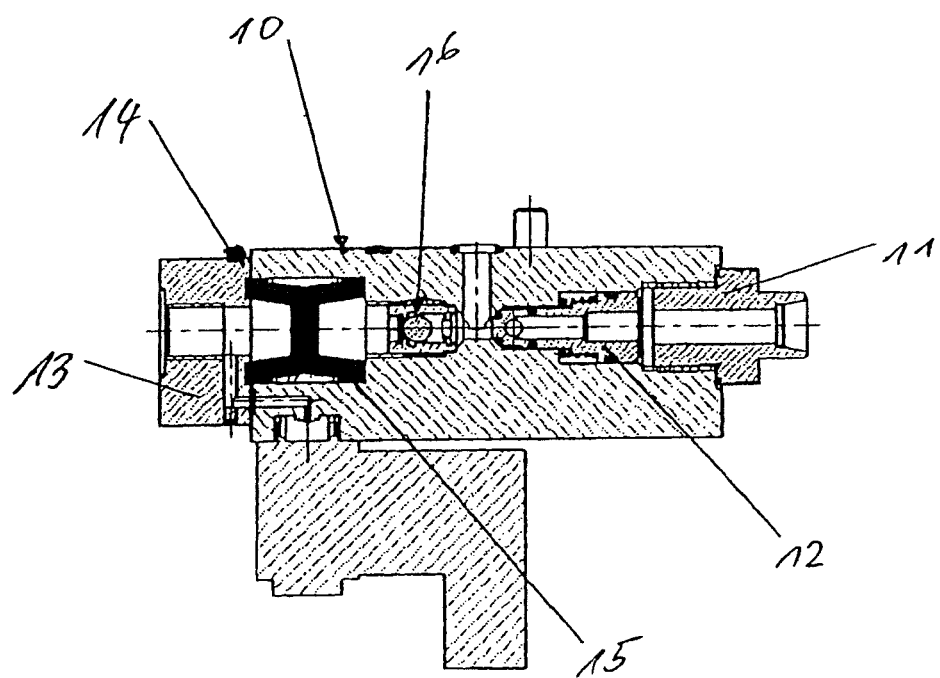
FIG. 2 is a sectional view of a control apparatus which is provided in the air regulator in accordance with the invention.

FIG. 2 shows details with respect to the design of the control apparatus 10 overall according to a preferred embodiment.

The control apparatus 10 comprises a port 11 on which there is a pre-separator pressure or pressure of an oil pre-separator of the compressor. The pre-separator pressure can run, for example, from 0 to the system pressure of 1.5 to 2.5 bar. Furthermore, the control apparatus 10 comprises a control piston 12 which can move back and forth in the control apparatus 10 and which is designed preferably from 0 to roughly 2 bar as a differential pressure piston. Also, the control apparatus 10 has a port 13 which is designed, for example, for control air of a pilot control apparatus 14. There is a valve magnet 15 for pilot control following the port 13 for control air. The valve magnet 15 has a relatively large cross section so that separation between the control line, which leads to the piston arrangement 3 and a relief line which is not shown in detail, can be omitted, as a result of which the construction effort is reduced.

Furthermore, the control apparatus 10 comprises a check valve 16 which is located between the control piston 12 and the valve magnet 15 of the pilot control apparatus 14.

In the exemplary embodiment which is shown using the drawings, the air regulator 1 is designed as a regulator which is open in its base state. In order to avoid high inertia starting when the compressor is started up, the control apparatus 10 immediately forces the air regulator 1 into its closed position using the pre-separator pressure prevailing there and the control piston 12, without a very strong pretensioning spring being required. In this way, the air regulator 1 has a more favorable control behavior with respect to the control quality and control rate. In compressor operation, therefore, the air regulator 1 implements precision control behavior. Pressure piling in the transition to idling of the compressor can also be avoided. The air regulator 1 in accordance with the invention enables gentle starting of the compressor by immediately closing the intake regulator 1 during starting.

Figure 3:
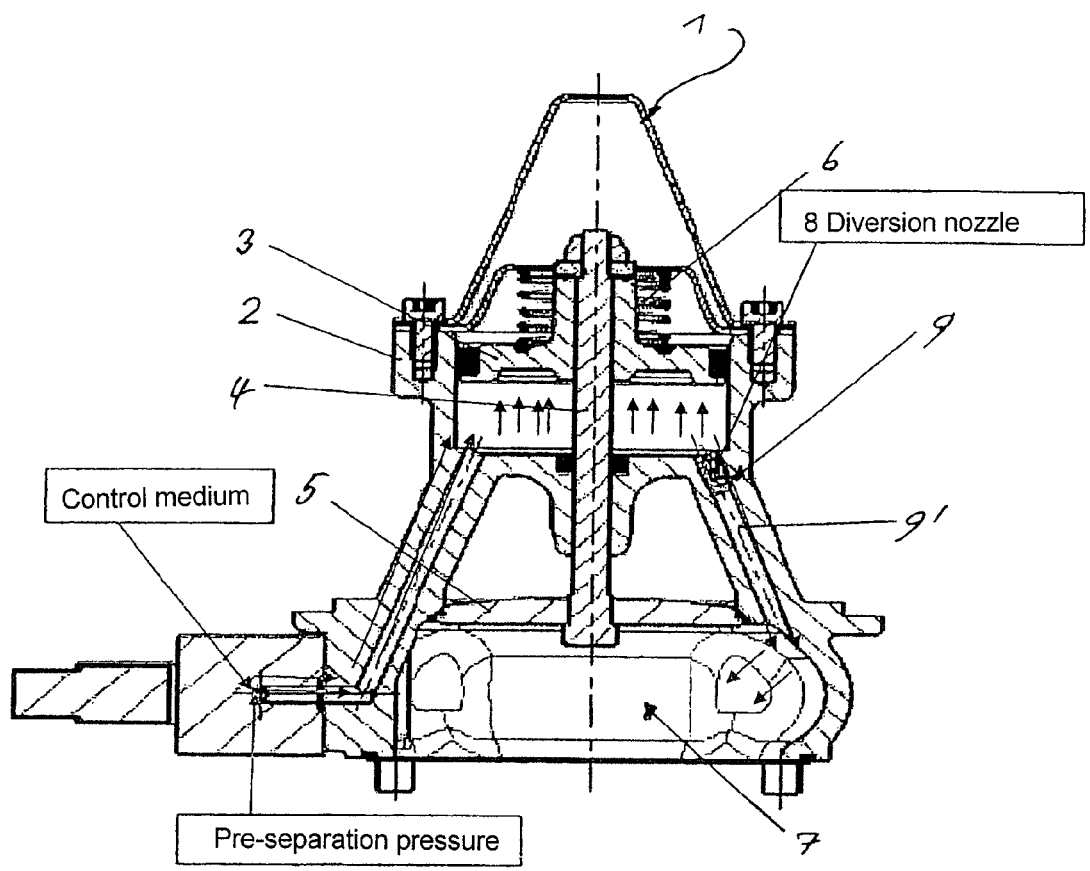
FIG. 3 is a sectional view of an air regulator in accordance with the invention with a diversion apparatus.

With reference to FIG. 3, other details of a preferred embodiment of an air regulator 1 in accordance with the invention are shown. In this air regulator 1, a diversion apparatus 9 is integrated into the regulator 1. The diversion apparatus 9 provides a connection of the control medium and the pre-separation pressure with continuous circulation via a diversion nozzle 8 which discharges directly via a bore 9' into the intake space 7 of the compressor. This diversion apparatus 9 is not provided external to the air regulator as is conventional, but is integrated directly into the air regulator 1 and the regulator housing 2 in order to achieve a structure of the air regulator 1 which is as compact as possible. The cross section of the diversion nozzle 8 is chosen such that the loading pressure for closing the air regulator 1 by the piston arrangement 3 and the diversion apparatus 9 always takes place linearly. Additional lines to be installed externally, and which can possibly cause leaks, can be avoided by the integration of the diversion apparatus 9 into the air regulator 1 and into the regulator housing 2 of the regulator.

The continuous circulation of the medium via the diversion apparatus 9 enables a continuous cleaning and lubrication of the compressor.

What is claimed is:

1. An air regulator for compressors, comprising:
an oil separator apparatus,
a regulator housing,
a valve element in said regulator housing, the valve element being spring-loaded on one side,
a piston arrangement connected to a control line for actuating the valve element,
pilot control apparatus with a pre-separation pressure port for connection to a source of pre-separation pressure, a valve magnet that is located between the control line and a control piston, the control piston being located between the pre-separation pressure port and said magnet, and
wherein the control piston, depending on a pre-separator pressure resulting from starting of a compressor to which the regulator is connected in use, in interaction with the pilot control apparatus actuates the valve element such that, when a compressor to which the regulator is connected is started, the regulator is immediately forced to assume a closed position, while in a base state the regulator assumes an open position.

2. The air regulator as claimed in claim 1, wherein the air regulator is adapted for being triggered in at least one of a pneumatic and electrical manner.

3. The air regulator as claimed in claim 1, wherein the air regulator is adapted for being triggered pneumatically, and the control apparatus contains a check valve between control medium and pre-separator medium areas.

4. The air regulator as claimed in claim 1, wherein the control apparatus is fastened directly on the regulator housing.

5. The air regulator as claimed in claim 1, wherein the control apparatus is in communication with the piston arrangement for loading of the valve element.

6. The air regulator as claimed in claim 1, wherein a diversion apparatus is integrated into the regulator housing.

7. The air regulator as claimed in claim 6, wherein the diversion apparatus comprises a diversion nozzle which in the regulator housing and which discharges directly via a bore into an intake space.

8. A regulated compressor arrangement, comprising:
a compressor, and
an air regulator connected to said compressor,
wherein the air regulator comprises:
an oil separator apparatus,
a regulator housing,
a valve element in said regulator housing, the valve element being spring-loaded on one side,
a piston arrangement connected to a control line for actuating the valve element,
pilot control apparatus with a pre-separation pressure port for connection to a source of pre-separation pressure, a valve magnet that is located between the control line and a control piston, the control piston being located between the pre-separation pressure port and said magnet, and
wherein the control piston, depending on a pre-separator pressure resulting from starting of the compressor to which the regulator is connected, in interaction with the pilot control apparatus actuates the valve element such that, when the compressor to which the regulator is connected is started, the regulator is immediately forced to assume a closed position, while in a base state the regulator assumes an open position.

9. The air regulator as claimed in claim 8, wherein the air regulator is integrated in a compressor housing of the compressor.

10. The air regulator as claimed in claim 8, wherein the compressor is a screw compressor.

* * * * *